US005412173A

United States Patent [19]

Muehlberger

[11] Patent Number: 5,412,173

[45] Date of Patent: May 2, 1995

[54] HIGH TEMPERATURE PLASMA GUN ASSEMBLY

[75] Inventor: Stephan E. Muehlberger, San Clemente, Calif.

[73] Assignee: Electro-Plasma, Inc., Irvine, Calif.

[21] Appl. No.: 156,388

[22] Filed: Nov. 22, 1993

Related U.S. Application Data

[63] Continuation of Ser. No. 882,518, May 13, 1992, abandoned.

[51] Int. Cl.[6] .............................................. B23K 10/00

[52] U.S. Cl. .......................... 219/121.47; 219/121.49; 219/121.51; 219/121.39; 219/121.48

[58] Field of Search ...................... 219/121.49, 121.48, 219/121.52, 121.51, 75, 74, 121.39, 121.45

[56] References Cited

U.S. PATENT DOCUMENTS

| | | | |
|---|---|---|---|
| 3,684,911 | 8/1972 | Perugini et al. | 219/121.49 |
| 3,914,573 | 10/1975 | Muehlberger | 219/76.16 |
| 4,328,257 | 5/1982 | Muehlberger . | |
| 4,423,304 | 12/1983 | Bass et al. | 219/121.47 |
| 4,445,021 | 4/1984 | Irons et al. | 219/121.48 |
| 4,587,397 | 5/1986 | Camacho et al. | 219/121.48 |
| 4,656,330 | 4/1987 | Poole | 219/121.52 |
| 4,668,853 | 5/1987 | Fey et al. | 219/121.49 |

*Primary Examiner*—Mark H. Paschall

*Attorney, Agent, or Firm*—Spensley Horn Jubas & Lubitz

[57] ABSTRACT

A plasma gun assembly for use in high temperature environments couples electrode and cooling water supplying hoses to a plasma gun via an extension arrangement having a conductive cathode extension tube coaxially disposed within a conductive anode extension tube. The cooling water flows through the hollow interior of the cathode extension tube to the plasma gun, then returns from the plasma gun via a passage formed between the outside of the cathode extension tube and the interior wall of the anode extension tube. In this manner the anode and cathode extension tubes are cooled as well as the plasma gun. Powder and plasma gas are supplied to the plasma gun by water-cooled tube arrangements in which such tubes are surrounded by intermediate and outer tubes forming separate passages. Cooling water is coupled via fittings to flow through the passages formed by the intermediate and outer tubes to provide cooling.

12 Claims, 3 Drawing Sheets

HIGH TEMPERATURE PLASMA GUN ASSEMBLY

This is a file-wrapper-continuation of application Ser. No. 07/882,518 filed on May 13, 1992, now abandoned.

BACKGROUND OF THE INVENTION

1. Field of the Invention

The present invention relates to plasma systems capable of thermal spraying of powdered materials for coating on a workpiece.

2. History of the Prior Art

It is known to provide a plasma system in which powders of metal or other composition are delivered to a plasma gun for introduction into a plasma stream or flame produced by the plasma gun. The plasma stream, which is created by a flow of inert gas with the application of an electrical power source and typically in the presence of low pressure, provided by a vacuum source, is directed from the plasma gun onto a workpiece or other target where the powder is deposited to form a coating. The powder, which may be preheated before introduction into the plasma stream at the gun, melts as it is entrained into and carried by the plasma stream so that a relatively dense coating is formed on the workpiece.

An example of such a plasma system is provided by U.S. Pat. No. 4,328,257 of Muehlberger et al., which patent issued May 4, 1982 and is commonly assigned with the present application. In the plasma system described in the Muehlberger et al. patent, a low pressure source in the form of vacuum pumps is coupled to an enclosure containing a plasma gun and a workpiece to direct the plasma stream from the plasma gun to the workpiece at supersonic speeds. A powder feed mechanism heats and delivers powder into the side of the plasma gun for introduction into the plasma stream.

In plasma systems of the type described in the '257 patent of Muehlberger et al., the plasma gun which has an anode and a cathode is water cooled by supplying cooling water from a water booster pump to a water inlet. From the water inlet, the cooling water circulates through a predetermined path within the plasma gun before exiting via a water outlet for return to the water booster pump. Cooling water from the water booster pump is provided to the water inlet of the plasma gun by a hose having a conductive inner tube which functions as the cathode connection to the plasma gun and which is coupled to a plasma power supply. The water outlet of the plasma gun is coupled by a second hose to return the water to the water booster pump. The second hose has a conductive inner tube which functions as the anode connection to the plasma gun and which is coupled to the plasma power supply. A tube coupled to a powder feed mechanism provides powder to the plasma gun with the help of a carrier gas flowing under pressure. Another tube couples a source of inert plasma gas to the plasma gun to provide plasma gas to the gun.

In most applications of plasma systems of the type described in the '257 patent of Muehlberger et al., the plasma gun and the connecting portions of the water-supplying electrode hoses and the powder and plasma gas supply tubes are subjected to moderate temperatures which are not substantially in excess of about 500° F. This does not adversely affect the hoses, which are typically Teflon-coated on the exterior thereof. Nor do such temperatures adversely affect the powder and gas supply tubes.

However, for certain applications of the plasma system, the plasma gun and the connections thereto may be subjected to temperatures substantially in excess of 500° F. This may occur, for example, where the plasma gun is located at the interior of a circular workpiece in order to spray the inner surface thereof. As the circular workpiece undergoes rotational motion relative to the plasma gun for spraying of the interior surface thereof, the temperatures in the vicinity of the plasma gun may be as high as 2,000° F. Temperatures of this magnitude do not adversely affect the plasma gun, which is water-cooled and essentially of metal construction. However, such high temperatures adversely affect the connecting hoses as well as the powder and plasma gas supply tubes. The Teflon-coated hoses rapidly deteriorate in the presence of such temperatures. In addition, conventional non-cooled powder and gas supply tubes will not function properly at temperatures of this magnitude.

It is therefore an object of the present invention to provide an improved plasma gun assembly. A more specific object of the invention is the provision of a plasma gun assembly capable of withstanding the high temperatures produced during certain operations such as spraying the interior of a circular part.

SUMMARY OF THE INVENTION

Plasma gun assemblies in accordance with the invention employ an extension arrangement for coupling the electrode and water-carrying hoses to the plasma gun. The extension arrangement is fluid-cooled and essentially of metal construction so as to be capable of withstanding very high temperatures. In addition, powder and plasma gas are supplied to the plasma gun by fluid-cooled tubes which are also capable of withstanding the high temperature environment. The extension arrangement includes fluid-cooled anode and cathode extensions of desired length for coupling the hoses to the plasma gun. The fluid-cooled powder and plasma gas delivery tubes are disposed adjacent the anode and cathode extensions and are coupled to the plasma guns.

In a preferred arrangement of a plasma gun assembly according to the invention, the anode and cathode extensions comprise hollow tubes, one of which is concentrically disposed within the other. The cathode extension comprises a hollow tube coupled to the cathode hose and having a hollow interior for delivering cooling water to the plasma gun. The cathode extension tube, which is cooled by the water flowing therethrough, is concentrically disposed within the hollow interior of an anode extension tube which is coupled to the anode hose. The space between the outer surface of the cathode extension tube and the adjacent inner wall of the anode extension tube forms a passage for return of the cooling water from the plasma gun to the anode hose. Such water cools the anode extension tube. The cathode and anode extension tubes are made of conductive material such as copper in order to electrically connect the conductive tubes within the hoses to the anode and the cathode of the plasma gun. The cathode and anode extension tubes are held in spaced-apart relation, and a hollow insulator tube is mounted on the outer surface of the cathode tube to prevent electrical contact with the surrounding anode tube.

The powder and plasma gas supply tubes are cooled by being concentrically disposed within intermediate and outer tubes forming a series of passages for cooling fluid which enters the passages and exits therefrom via fittings mounted on the outer tube. The passages extend along substantially the entire length of the powder or plasma gas supply tube so as to cool substantially the entire length thereof.

In the preferred arrangement of the plasma gun assembly according to the invention, the ends of the cathode and anode extension tubes opposite the plasma gun are mounted in a connection block assembly, from which the cathode extension tube extends into an insulator block for coupling to a cathode fitting which receives the cathode hose. An anode fitting on the connection block assembly couples the anode hose to a hollow interior communicating with the space between the cathode and anode extension tubes. The connection block assembly electrically couples the anode fitting to the anode extension tube. A hollow, generally cylindrical boot extension extends outwardly from the insulator block and surrounds the cathode fitting. The opposite ends of the cathode and anode extension tubes extend into the plasma gun to connect the hollow interior of the cathode extension tube to the water inlet for the plasma gun cooling system and the space between the cathode and anode extension tubes to the water outlet for such system. At the same time, the anode and cathode extension tubes make electrical contact with the anode and cathode of the plasma gun.

BRIEF DESCRIPTION OF THE DRAWINGS

A better understanding of the invention may be had by reference to the following specification in conjunction with the accompanying drawings in which.

DETAILED DESCRIPTION

Figure 1:
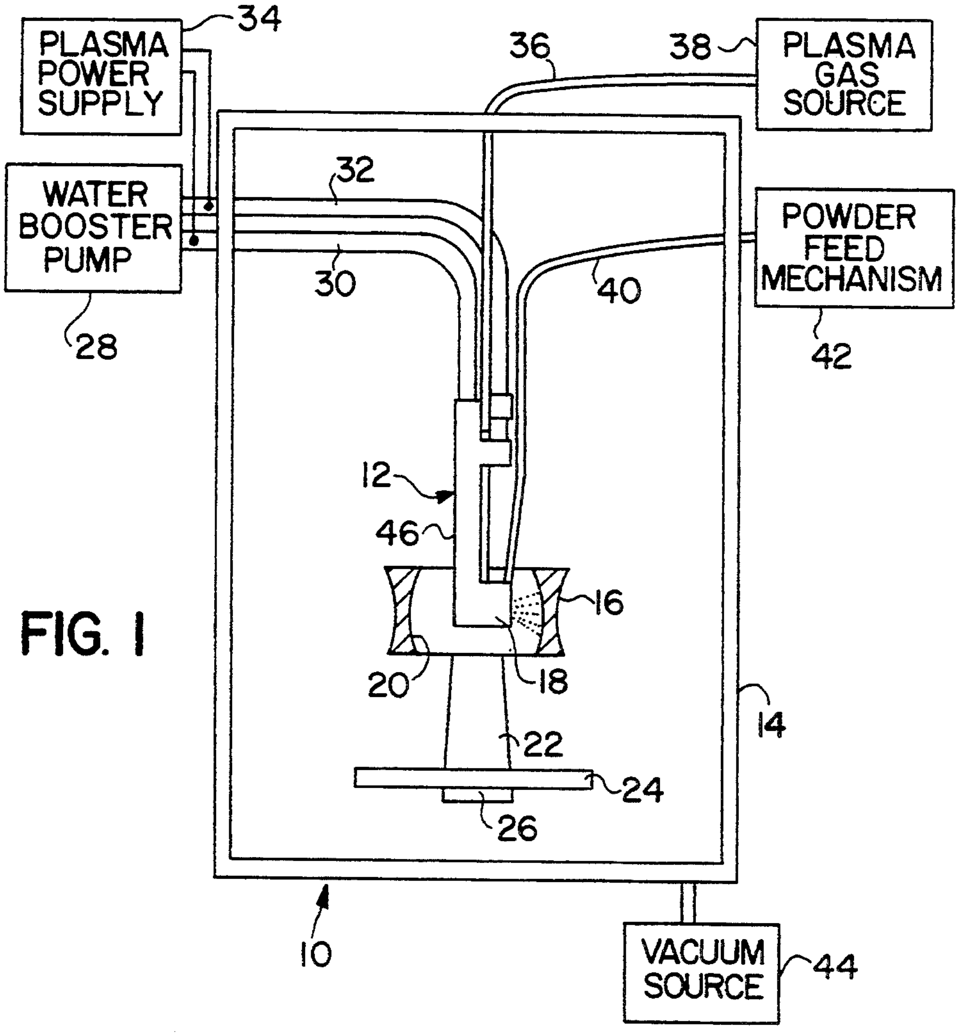
FIG. 1 is a combined block diagram and broken-away representation of a plasma system employing a plasma gun assembly according to the invention.
Figure 4:
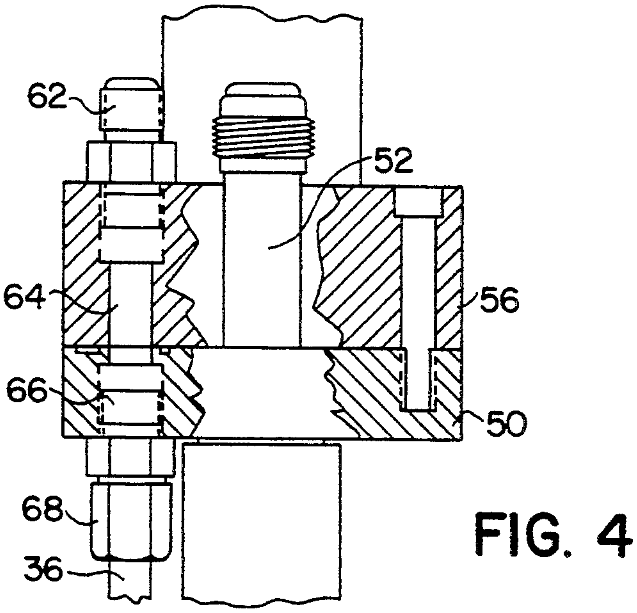
FIG. 4 is a partial sectional view of a portion of the plasma gun assembly of FIG. 1.
Figure 2:
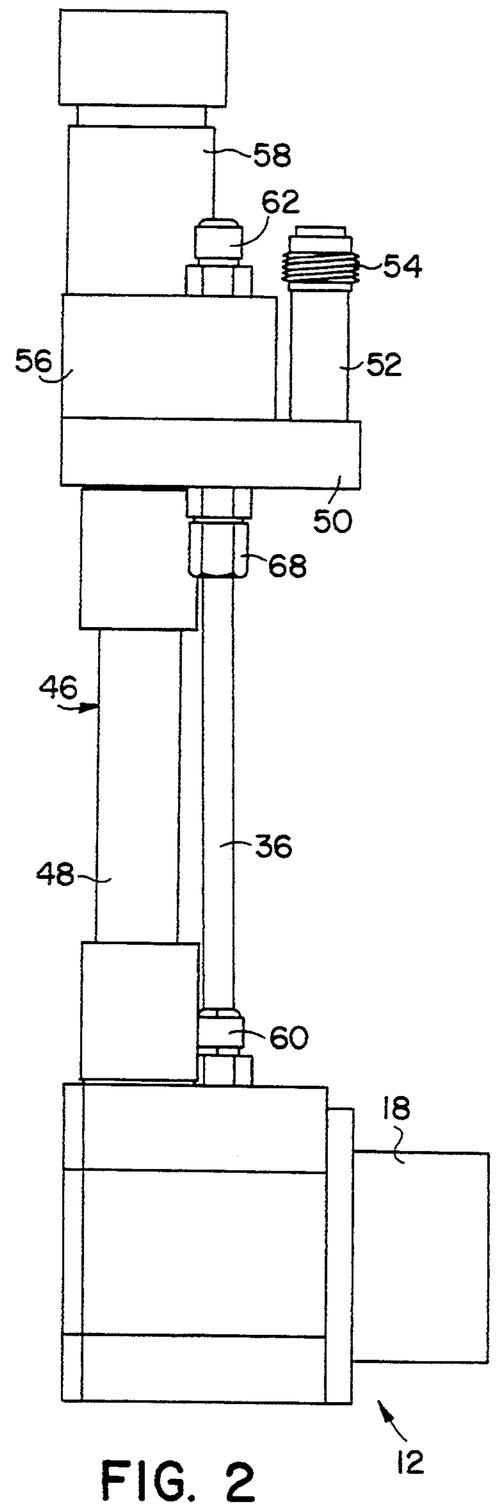
FIG. 2 is an enlarged side view of the plasma gun assembly of FIG. 1.
Figure 3:
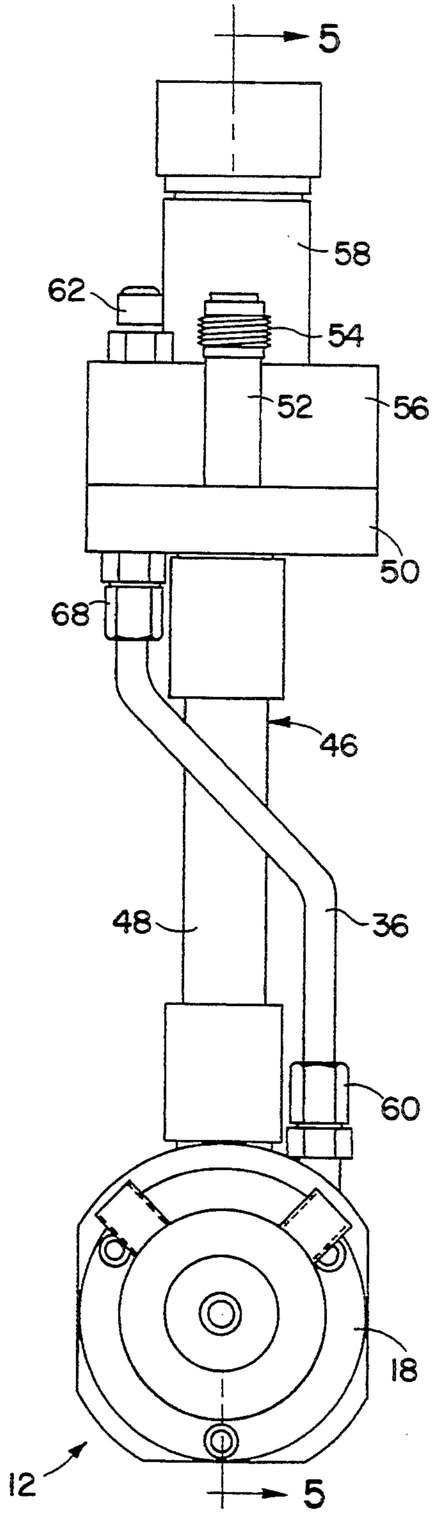
FIG. 3 is an enlarged front view of the plasma gun assembly of FIG. 1.

FIG. 1 is a simplified representation of a plasma system 10 having a plasma gun assembly 12 according to the invention. The plasma system 10 may be of the type described in the previously referred U.S. Pat. No. 4,328,257 of Muehlberger et al., which patent is incorporated herein by reference as providing a detailed example of a plasma system.

The plasma system 10 of FIG. 1 includes a sealed enclosure 14 which contains the plasma gun assembly 12 and a workpiece 16. The plasma gun assembly 12 terminates at a lower end thereof in a plasma gun 18 disposed within the hollow interior of the circular workpiece 16 in order to spray a coating on an interior surface 20 of the workpiece 16. The workpiece 16, which is shown in sectional view in FIG. 1, is mounted by a pedestal 22 on a turntable 24. As the turntable 24 is rotated via a rotating drive 26, the workpiece 16 rotates around the plasma gun 18. This enables the plasma gun 18 to spray the entire interior surface 20 of the workpiece 16.

A water booster pump 28 located outside of the enclosure 14 is coupled to the plasma gun assembly 12 by a cathode hose 30 and an anode hose 32. The cathode hose 30 serves to deliver cooling water from the booster pump 28 to the plasma gun assembly 12. In addition, a conductive tube within the cathode hose 30 electrically couples the negative terminal of a plasma power supply 34 to the plasma gun assembly 12. After water from the booster pump 28 is applied to cool the plasma gun assembly 12, the water is returned to the booster pump 28 by the anode hose 32. The anode hose 32 also has a conductive tube therein for electrically coupling the positive terminal of the plasma power supply 34 to the plasma gun assembly 12.

Electrical coupling of the plasma power supply 34 to the plasma gun assembly 12 provides the desired plasma stream or flame upon introduction of a plasma gas into the plasma gun 18. Such plasma gas is provided by a plasma gas supply tube 36 coupled to a plasma gas source 38. The plasma gas may be an inert gas such as argon, or a mixture of such inert gasses.

A powder supply tube 40 couples a powder feed mechanism 42 to the plasma gun 18, whereby metal powder or other particulate matter is introduced into the plasma stream for spraying onto the interior surface 20 of the workpiece 16.

A low pressure environment is provided within the enclosure 14 by a vacuum source 44 coupled to the interior of the enclosure 14.

The cathode and anode hoses 30 and 32 are of conventional design. As such, the hoses 30 and 32 are not capable of withstanding very high temperatures such as those substantially in excess of 500° F. At the same time, disposition of the plasma gun 18 within the workpiece 16 creates a very high temperature environment in which the temperatures can reach as much as 2,000° F. Accordingly, the plasma gun assembly 12 employs an extension arrangement 46 for coupling the hoses 30 and 32 to the plasma gun 18. As described hereafter, the extension arrangement 46 is capable of withstanding the high temperatures in the region of the plasma gun 18, even though the hoses 30 and 32 are not. Moreover, the plasma gas supply tube 36 and the powder supply tube 40, both of which coupled to the plasma gun 18, are adequately cooled in the vicinity of the plasma gun 18, as described hereafter.

The plasma gun assembly 12 is shown in detail in FIGS. 2–5. As shown therein the extension arrangement 46 includes an anode extension tube 48 extending upwardly from the plasma gun 18 at a lower end thereof to a connection block assembly 50 at an upper end thereof. The connection block assembly 50 includes an anode fitting 52 mounted thereon and terminating in a threaded end 54 for receiving the anode hose 32 shown in FIG. 1. The connection block assembly 50 abuts an insulator block 56, from which a hollow, generally cylindrical boot extension 58 extends. As described in detail hereafter in connection with FIG. 5, the boot extension 58 surrounds a cathode fitting for receiving the cathode hose 30.

The plasma gas supply tube 36 which is shown in FIG. 1 extends through the insulator block 56 and the connection block assembly 50 and couples to the plasma gun 18 at a fitting 60. The tube 36 couples to the insulator block 56 via a fitting 62. As shown in the sectional view of FIG. 4, the fitting 62 couples the tube 36 through apertures 64 and 66 in the insulator block 56 and the connection block assembly 50, respectively, to a fitting 68 at the bottom of the connection block assembly 50. From the fitting 68, the tube 36 extends to the fitting 60 at the plasma gun 18.

Figure 5:
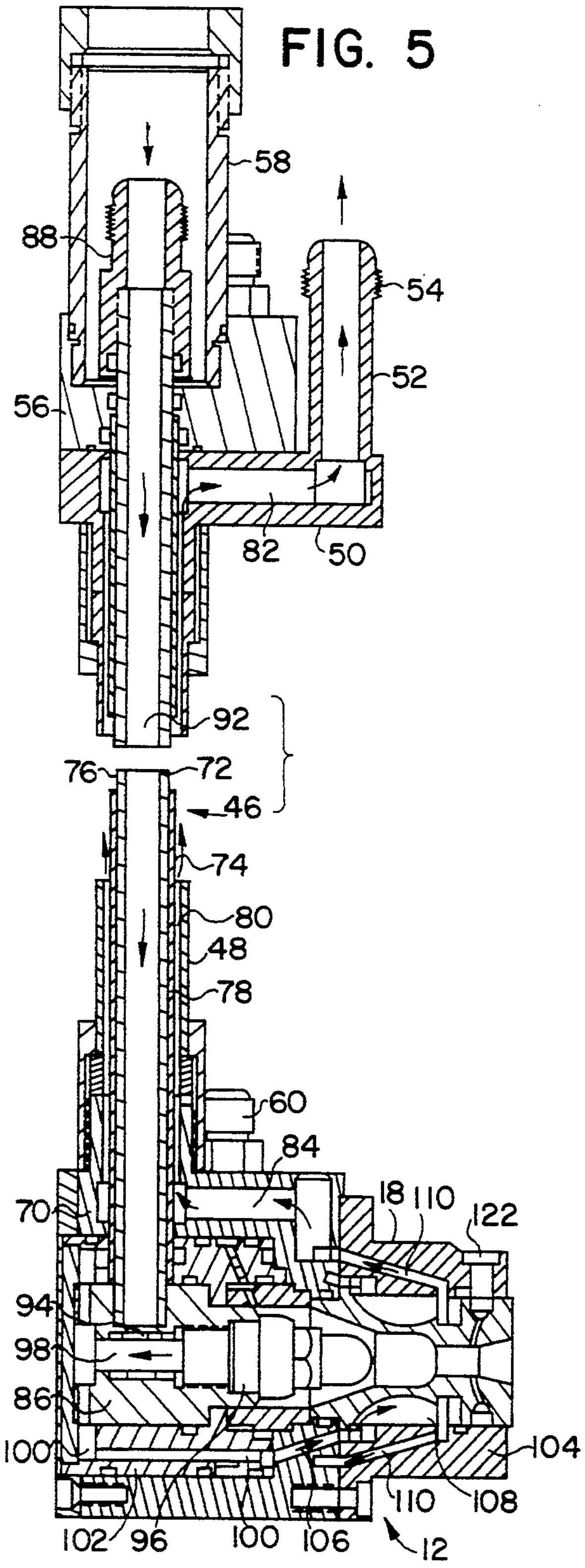
FIG. 5 is a sectional view of the plasma gun assembly of FIG. 1 taken along the line 5—5 of FIG. 3.

As shown in FIG. 5, the anode extension tube 48 extends downwardly from the connection block assembly 50 to the plasma gun 18. Within the plasma gun 18, the anode extension tube 48 makes electrical contact with an anode body assembly 70 forming part of the anode of the plasma gun 18. At its opposite upper end, the anode extension tube 48 extends into contact with the connection block assembly 50 which has the anode fitting 52 mounted thereon. The connection block assembly 50 and the anode fitting 52 are of conductive material, as is the anode extension tube 48 which may be made of copper. In this manner, a conductive path is provided between the anode hose 32, which is coupled to the anode fitting 52, and the anode body assembly 70 of the plasma gun 18.

In addition to the anode extension tube 48, the extension arrangement 46 includes a hollow cathode extension tube 72. The cathode extension tube 72 is concentrically disposed within the anode extension tube 48, and has an insulator tube 74 mounted on an outer surface 76 thereof. The insulator tube 74, which is made of Teflon or other appropriate electrical insulating material, prevents inadvertent contact of the anode extension tube 48 with the cathode extension tube 72. A passage 78 of generally uniform width is formed between the insulator tube 74 at the outer surface 76 of the cathode extension tube 72 and an inner wall 80 of the anode extension tube 48. The passage 78 extends along the lengths of the anode extension tube 48 and the cathode extension tube 72, and communicates with an aperture 82 within the connection block assembly 50 and with an aperture 84 within the anode body assembly 70 of the plasma gun 18.

The cathode extension tube 72 extends upwardly from a cathode holder assembly 86 within the plasma gun 18 and through the connection block assembly 50 to the insulator block 56. At the other side of the insulator block 56 from the connection block assembly 50, the cathode extension tube 72 extends into and is coupled to a cathode fitting 88 within the hollow interior of the boot extension 58. The cathode fitting 88 has a threaded end 90 thereof for receipt of the cathode hose 30. In this manner a conductive path is formed between the cathode hose 30 and the cathode holder assembly 86 within the plasma gun 18. The insulator tube 74 on the outer surface 76 of the cathode extension tube 72 extends through the connection block assembly 50 to insulate the cathode extension tube 72 from the connection block assembly 50. The insulator block 56 is made of insulative material. The cathode extension tube 72 is made of conductive material such as copper.

As previously described in connection with FIG. 1, the cathode hose 30 supplies cooling water from the water booster pump 28. Such cooling water is provided to the cathode fitting 88, from which it flows through a hollow interior 92 of the cathode extension tube 72 to an aperture 94 within the cathode holder assembly 86 of the plasma gun 18. From the aperture 94, the cooling water flows forwardly through a cathode assembly 96 and then back into a passage 98. From the passage 98, the cooling water flows into a passage 100 in an insulator housing 102. The insulator housing 102 separates the cathode assembly 96 from the anode body assembly 70 and an anode retainer 104 within the plasma gun 18. From the passage 100, the cooling water flows through a passage 106 in the anode body assembly 70 and into a cavity 108 in a forward portion of the cathode holder assembly 86. From the cavity 108, the cooling water exits via passages 110 to the aperture 84 in the anode body assembly 70.

From the aperture 84, the cooling water exits the plasma gun 18 by flowing into the passage 78 between the anode extension tube 48 and the cathode extension tube 72. The cooling water flows upwardly the passage 78 to the aperture 82 within the connection block assembly 50. From the aperture 82, the cooling water flows into the anode fitting 52 and is returned to the water booster pump 28 by the anode hose 32.

The coaxial arrangement of the anode extension tube 48 and the cathode extension tube 72 forming the extension arrangement 46 is cooled by the cooling water as the water is delivered to the plasma gun 18 and returned to the water booster pump 28. As the cooling water flows through the hollow interior 92 of the cathode extension tube 72 to the plasma gun 18, the cathode extension tube 72 is cooled by the water. As the cooling water is returned to the water booster pump 28 from the plasma gun 18 via the passage 78, both the anode extension tube 48 and the cathode extension tube 72 are cooled by the water. Such cooling and the copper or other metallic composition of the extension tubes 48 and 72 enable the extension arrangement 46 to withstand the high temperatures encountered in the plasma spraying environment described in connection with FIG. 1. The extension arrangement 46 may be of virtually any desired length which is adequate to allow maneuverability of the plasma gun assembly 12 while at the same time locating the cathode hose 30 and the anode hose 32 at a safe distance from the high temperatures in the vicinity of the plasma gun 18.

Figure 6:
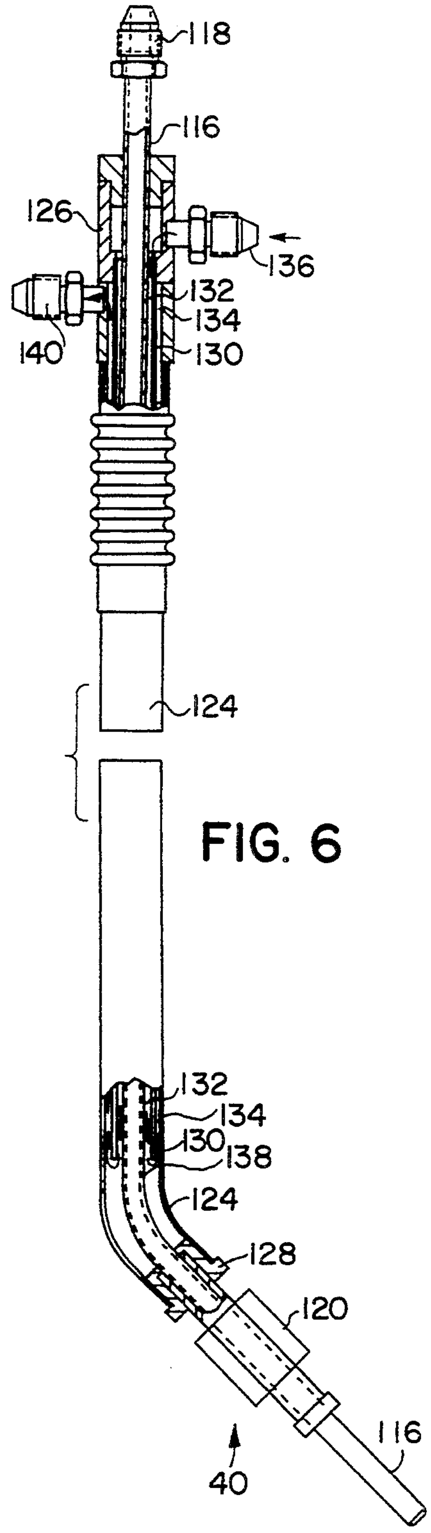
FIG. 6 is a front view, partly broken-away, of the powder supply tube arrangement used with the plasma gun assembly of FIG. 1.

In addition to the extension arrangement 46, the plasma gas supply tube 36 and the powder supply tube 40 must also be cooled, particularly in the vicinity of the plasma gun 18. FIG. 6 shows a water cooled arrangement of the powder supply tube 40 in accordance with the invention. A similar water cooled arrangement can be used for the plasma gas supply tube 36.

Referring to FIG. 6, the powder supply tube 40 has an inner powder delivery tube 116 having a connection fitting 118 at an upper end thereof and a fitting 120 at an opposite lower end thereof. The fitting 120 is used to secure the lower end of the powder delivery tube 116 within a receptacle 122 in the anode retainer 104 of the plasma gun 18 shown in FIG. 5.

A hollow outer tube 124 is concentrically disposed about the powder delivery tube 116 along most of the length of the powder delivery tube 116. The outer tube 124 is held in this position by a manifold assembly 126 at the upper end of the powder delivery tube 116 and a spacer 128 at the lower end of the powder delivery tube 116. A hollow intermediate tube 130 is concentrically disposed between the powder delivery tube 116 and the outer tube 124. The intermediate tube 130 forms a first passage 132 with the powder delivery tube 116 and a second passage 134 with the outer tube 124.

A cooling water inlet fitting 136 mounted on the manifold assembly 126 is coupled to a supply of cooling water, such as the water booster pump 28 shown in FIG. 1. The manifold 126 directs the cooling water into the first passage 132 between the powder delivery tube 116 and the intermediate tube 130. The cooling water flows through the first passage 132 to a lower end 138 of the intermediate tube 130. At the lower end 138, the cooling water reverses flow direction and flows into the second passage 134 between the intermediate tube 130 and the outer tube 124. The cooling water flows upwardly through the second passage 134 to the manifold assembly 126 where it exits via a cooling water outlet fitting 140 mounted on the manifold assembly 126.

By providing a flow of cooling water along substantially the entire length of the powder delivery tube 116, in a first direction through the first passage 132 and then in a reverse direction through the second passage 134, substantial cooling of the powder delivery tube 116 is provided. This enables the powder supply tube 40 to be coupled to the plasma gun 18 in very high temperature environments such as that described in connection with FIG. 1. The plasma gas supplied via tube 36 to the plasma gun 18 may also be cooled using an arrangement similar to that shown in FIG. 6.

While the invention has been particularly shown and described with reference to preferred embodiments thereof, it will be understood by those skilled in the art that various changes in form and details may be made therein without departing from the spirit and scope of the invention.

I claim:

1. A plasma gun assembly comprising the combination of:

a plasma gun having an anode and a cathode;

a power supply;

an anode coupling attached to the power supply and capable of withstanding temperatures up to a given maximum temperature;

a cathode coupling attached to the power supply and capable of withstanding temperatures up to the given maximum temperature;

an anode extension extending between and coupling the anode coupling to the anode of the plasma gun, the anode extension being capable of withstanding temperatures substantially above the given maximum temperature;

a cathode extension extending between and coupling the cathode coupling to the cathode of the plasma gun, the cathode extension being capable of withstanding temperatures substantially above the given maximum temperature; and the anode extension comprising a hollow tube, the cathode extension comprising a tube concentrically disposed within the hollow tube of the anode extension, the tube comprising the cathode extension having a hollow interior, the cathode coupling providing cooling fluid to the plasma gun via the hollow interior of the tube comprising the cathode extension, and the anode coupling receiving cooling fluid returned from the plasma gun via a space between the hollow tube comprising the anode extension and the tube comprising the cathode extension.

2. A plasma gun assembly comprising the combination of:

a plasma gun having an anode and a cathode;

a power supply;

an anode coupling attached to the power supply and capable of withstanding temperatures up to a given maximum temperature;

a cathode coupling attached to the power supply and capable of withstanding temperatures up to the given maximum temperature;

an anode extension extending between and coupling the anode coupling to the anode of the plasma gun, the anode extension being capable of withstanding temperatures substantially above the given maximum temperature;

a cathode extension extending between and coupling the cathode coupling to the cathode of the plasma gun, the cathode extension being capable of withstanding temperatures substantially above the given maximum temperature;

a powder supply tube disposed adjacent the anode extension and the cathode extension and coupled to the plasma gun;

means for cooling the powder supply tube;

a plasma gas supply tube disposed adjacent the anode extension and the cathode extension and coupled to the plasma gun; and means for cooling the plasma gas supply tube.

3. The invention set forth in claim 2, wherein the means for cooling the powder supply tube comprises means for flowing a cooling fluid over at least a portion of the length of the powder supply tube, and the means for cooling the plasma gas supply tube comprises means for flowing a cooling fluid over at least a portion of the length of the plasma gas supply tube.

4. A high temperature plasma gun assembly comprising the combination of:

a plasma gun having an anode and a cathode;

a first hollow tube coupled to the anode of the plasma gun and forming an anode extension;

a second hollow tube coupled to the cathode of the plasma gun, the second hollow tube being concentrically disposed within the first hollow tube and forming a cathode extension;

a connection block assembly spaced from the plasma gun and receiving the anode and the cathode extensions therein;

an anode fitting mounted on the connection block assembly and having a hollow interior for receiving cooling fluid therein, the connection block assembly having a hollow interior coupling the hollow interior of the anode fitting to a space between an outer surface of the cathode extension and an inner surface of the anode extension; and a cathode fitting coupled to the cathode extension adjacent the connection block assembly and having a hollow interior for receiving a cooling fluid and coupled to a hollow interior of the cathode extension.

5. The invention set forth in claim 4, wherein the plasma gun has a fluid cooling system having an inlet and an outlet, the inlet being coupled to the hollow interior of the cathode extension and the outlet being coupled to the space between the outer surface of the cathode extension and the inner surface of the anode extension.

6. The invention set forth in claim 4, further including an insulator block disposed about the cathode extension between the connector block assembly and the cathode fitting.

7. The invention set forth in claim 6, further including a hollow, generally cylindrical boot extension coupled to the insulator block and surrounding the cathode fitting.

8. The invention set forth in claim 6, further including a plasma gas supply tube mounted in the insulator block and extending to the plasma gun.

9. The invention set forth in claim 8, further including means for water-cooling the plasma gas supply tube.

10. A plasma gun assembly comprising the combination of:

a plasma gun having an anode and a cathode;

a power supply;

an anode coupling attached to the power supply and capable of withstanding temperatures up to a given maximum temperature;

a cathode coupling attached to the power supply and capable of withstanding temperatures up to the given maximum temperature;

an anode extension extending between and coupling the anode coupling to the anode of the plasma gun, the anode extension being capable of withstanding temperatures substantially above the given maximum temperature;

a cathode extension extending between and coupling the cathode coupling to the cathode of the plasma gun, the cathode extension being capable of withstanding temperatures substantially above the given maximum temperature;

one of the anode and cathode extensions comprising a first hollow tube and the other one of the anode and cathode extensions comprising a second hollow tube concentrically disposed within the first hollow tube, a hollow interior of the second hollow tube defining a first cooling water path between the anode and cathode couplings and the plasma gun, and a space between a hollow interior of the first hollow tube and an exterior of the second hollow tube defining a second cooling water path between the anode and cathode couplings and the plasma gun;

means for providing cooling water to the plasma gun via one of the first and second cooling water paths; and means for returning water from the plasma gun via the other one of the first and second cooling water paths.

11. The invention set forth in claim 10, further including a plasma gas supply tube disposed adjacent the first hollow tube and coupled to the plasma gun, and means for cooling the plasma gas supply tube.

12. The invention set forth in claim 11, further including a powder supply tube disposed adjacent the first hollow tube and coupled to the plasma gun, and means for cooling the powder supply tube.

* * * * *